United States Patent [19]

Hirayama et al.

[11] Patent Number: 5,715,356
[45] Date of Patent: Feb. 3, 1998

[54] APPARATUS FOR PROCESSING COMPRESSED VIDEO SIGNALS WHICH ARE BE RECORDED ON A DISK OR WHICH HAVE BEEN REPRODUCED FROM A DISK

[75] Inventors: Koichi Hirayama, Yokohama; Yuichi Miyano, Kamakura, both of Japan

[73] Assignee: Kabushiki Kaisha Toshiba, Kawasaki, Japan

[21] Appl. No.: 307,147

[22] Filed: Sep. 16, 1994

[30] Foreign Application Priority Data

Sep. 16, 1993 [JP] Japan ................. 5-229910
Oct. 29, 1993 [JP] Japan ................. 5-271639

[51] Int. Cl.⁶ ........................... H04N 5/76; H04N 5/92
[52] U.S. Cl. ..................... 386/96; 386/95; 386/111; 386/125; 386/112
[58] Field of Search ........................ 358/335, 342, 358/341, 343; 360/19.1, 32; 348/462, 468; 386/46, 111, 124, 95, 96, 98, 125, 109, 112; H04N 5/76, 5/92

[56] References Cited

U.S. PATENT DOCUMENTS

| | | |
|---|---|---|
| 3,757,225 | 9/1973 | Ulicki . |
| 4,587,558 | 5/1986 | Sugiyama et al. . |
| 4,614,982 | 9/1986 | Ibaraki . |
| 4,680,647 | 7/1987 | Moriyama . |
| 4,777,537 | 10/1988 | Ueno et al. ................. 358/341 |
| 4,800,446 | 1/1989 | Kanamaru . |
| 4,843,484 | 6/1989 | Kanamaru et al. . |
| 4,870,613 | 9/1989 | Clinkenbeard et al. . |
| 4,893,193 | 1/1990 | Nakamura et al. . |
| 4,947,244 | 8/1990 | Fenwick et al. . |
| 4,989,097 | 1/1991 | Yoshio et al. . |
| 4,992,782 | 2/1991 | Sakamoto et al. ................. 348/600 |
| 4,992,886 | 2/1991 | Klappert . |
| 5,010,417 | 4/1991 | Yoshio et al. . |
| 5,016,113 | 5/1991 | Yamashita et al. . |
| 5,043,826 | 8/1991 | Yoshio et al. . |
| 5,063,551 | 11/1991 | Yoshio et al. . |
| 5,065,252 | 11/1991 | Yoshio et al. . |
| 5,089,899 | 2/1992 | Nomura et al. . |
| 5,097,348 | 3/1992 | Suetaka ................. 386/95 |
| 5,097,349 | 3/1992 | Nomura et al. . |
| 5,107,343 | 4/1992 | Kawai . |
| 5,128,775 | 7/1992 | Suzuki et al. . |
| 5,132,807 | 7/1992 | Takimoto et al. . |
| 5,191,436 | 3/1993 | Yonemetsu ................. 358/335 |
| 5,218,454 | 6/1993 | Nagawasa et al. . |
| 5,225,904 | 7/1993 | Golin et al. ................. 348/410 |
| 5,233,438 | 8/1993 | Funahashi et al. . |
| 5,243,582 | 9/1993 | Yamauchi et al. ................. 358/342 |
| 5,270,828 | 12/1993 | Mogi . |
| 5,274,463 | 12/1993 | Matsumoto et al. . |
| 5,280,572 | 1/1994 | Case et al. . |
| 5,282,186 | 1/1994 | Yoshio et al. . |
| 5,315,400 | 5/1994 | Kurata et al. . |
| 5,336,844 | 8/1994 | Yamauchi et al. . |
| 5,400,077 | 3/1995 | Cookson et al. . |
| 5,412,514 | 5/1995 | Kobayashi . |
| 5,442,456 | 8/1995 | Hansen . |
| 5,446,597 | 8/1995 | Matsumi et al. ................. 358/343 |
| 5,455,684 | 10/1995 | Fujinami et al. ................. 358/342 |
| 5,513,010 | 4/1996 | Kori et al. . |

FOREIGN PATENT DOCUMENTS

| | | |
|---|---|---|
| 0 245 904 | 11/1987 | European Pat. Off. . |
| 0 540 164 | 5/1993 | European Pat. Off. . |
| 0 558 848 | 9/1993 | European Pat. Off. . |
| 0 558 853 | 9/1993 | European Pat. Off. . |
| 37 18 567 | 12/1988 | Germany . |

OTHER PUBLICATIONS

Abstract of Japanese Pat. Appln. No. Hei 8–149407; Jun. 1996.
Abstract of Japanese Pat. Appln. No. 4–216732; Mar. 1994.
Abstract of Japanese Pat. Appln. No. 3–347985; Jun. 1993.
The full Motion System for CD–I; J.van der Meer; IEEE Transaction on Consumer Electronics vol. 38, No. 4 Nov. 1992, pp. 910–920.

*Primary Examiner*—Thai Tran
*Assistant Examiner*—Huy Nguyen
*Attorney, Agent, or Firm*—Cushman Darby & Cushman IP Group of Pillsbury Madison & Sutro LLP

[57] ABSTRACT

An apparatus for generating compressed signals, which can serve to record data with high efficiency, to manage data easily, to reproduce programs in a special manner, to search for data at high speed, and to achieve accurate image-speech synchronization. The apparatus comprises a video-data grouping device for processing video data into groups, each consisting of a predetermined number of video data items corresponding to image frames; a video-data compressing device for compressing and encoding the video data items of each group; an audio-data grouping device for processing audio data corresponding to the video data into groups, each group consisting of audio data items; an audio-data compressing device for compressing and encoding the audio data items of each group; a sub-video data grouping device for processing sub-video data into groups, each group consisting of sub-video data items; a sub-video data compressing device for compressing and encoding the sub-video data items of each group; a formatter for combining the groups of compressed video data items, the groups of compressed audio data items and the groups of compressed sub-video data items thereby generating a data unit.

3 Claims, 17 Drawing Sheets

MODE-1 [GOP=6]
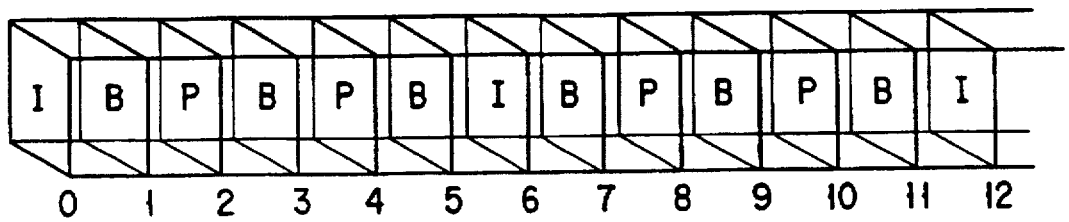
FIG. 1A
[OUTPUT IMAGE]
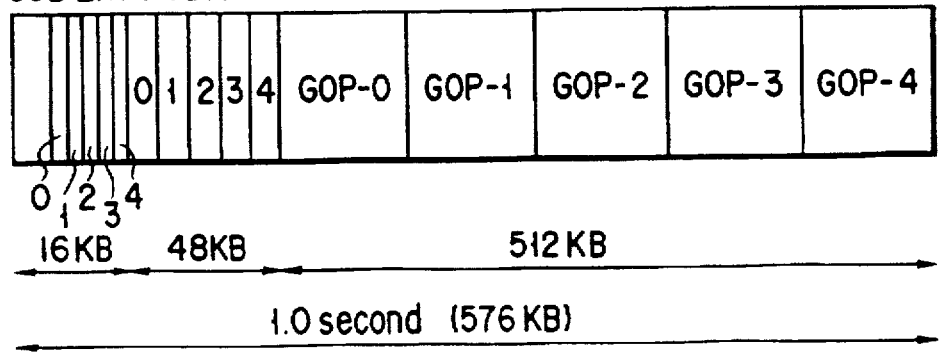
FIG. 1B
FIG. 1C

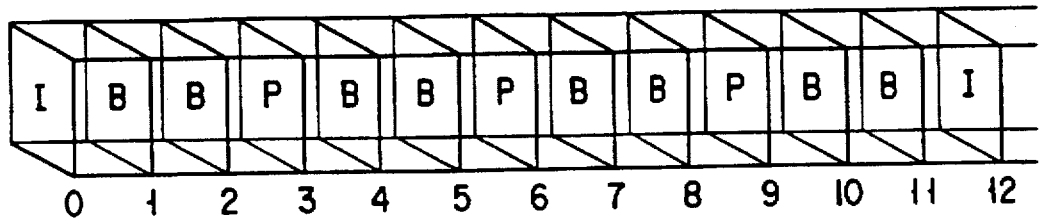
FIG. 2A
FIG. 2B
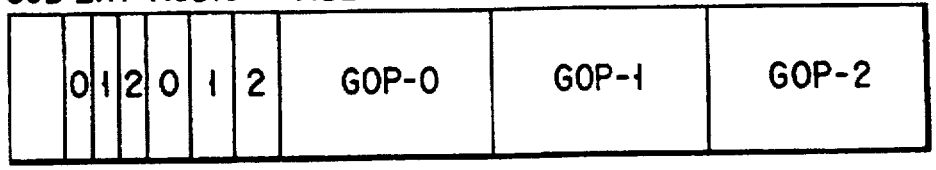
FIG. 2C

MODE-3 [GOP=10]
[CODE-DATA] 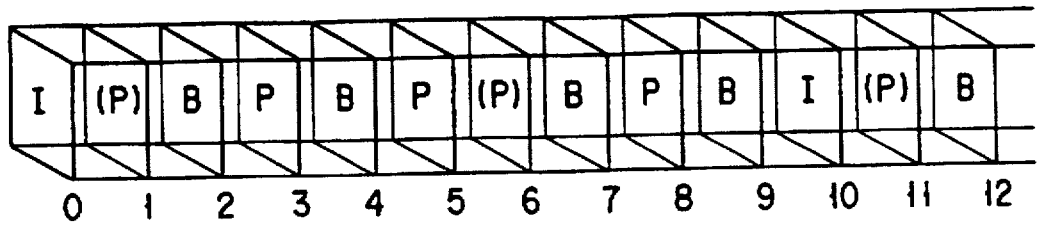
F I G. 3A
[OUTPUT IMAGE]
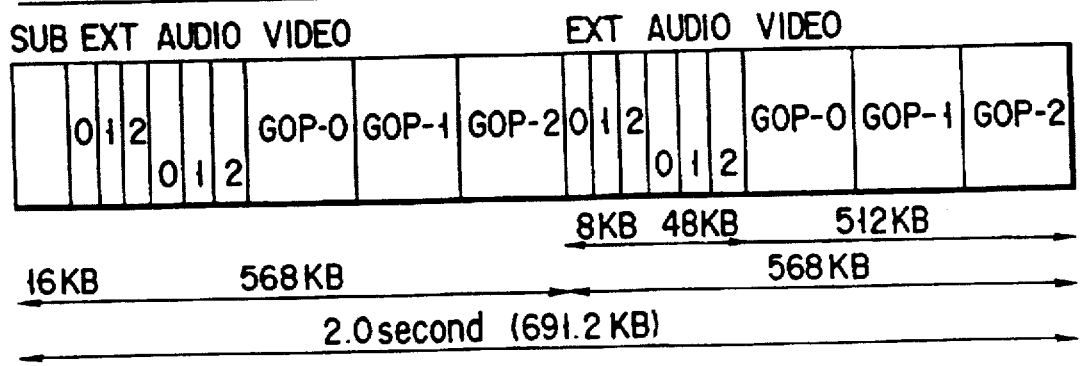
F I G. 3B
F I G. 3C

| TYPE | DATA LAYOUT |
|---|---|
| VID | [ 256 BYTE ] x 1 |
| PIF | [ 16 BYTE ] x NUMBER OF PROGRAM |
| DAT | [ 8 BYTE ] x NUMBER OF DATA UNIT |

FIG. 5A

| PARAMETER | DESCRIPTION | NUMBER OF BYTES USED |
|---|---|---|
| ATMB | ABSOLUTE START TIME | 2 BYTES |
| PINF | PROGRAM ATTRIBUTE | 1 BYTE |
| GINF | GOP STRUCTURE ATTRIBUTE | 1 BYTE |
| EINF | EXPANSION CODE ATTRIBUTE | 1 BYTE |
| AINF | AUDIO ENCODING SYSTEM | 1 BYTE |
| VINF | VIDEO ENCODING SYSTEM | 1 BYTE |
| ATRP | PICTURE ATTRIBUTE | 1 BYTE |
| HRES | HORIZONTAL RESOLUTION | 2 BYTES |
| VRES | VERTICAL RESOLUTION | 2 BYTES |
| PNTB | START POINTER | 2 BYTES |
| PGML | PROGRAM LINK | 2 BYTES |

FIG. 5B

| PARAMETER | DESCRIPTION | NUMBER OF BYTES USED |
|---|---|---|
| NZON | ZONE NO. | 1 BYTE |
| NSCT | CENTER NO. | 1 BYTE |
| NTRC | TRACK NO. | 2 BYTES |
| PTMB | PROGRAM TIME | 2 BYTES |
| PNTL | LINK POINTER | 2 BYTES |

FIG. 5C

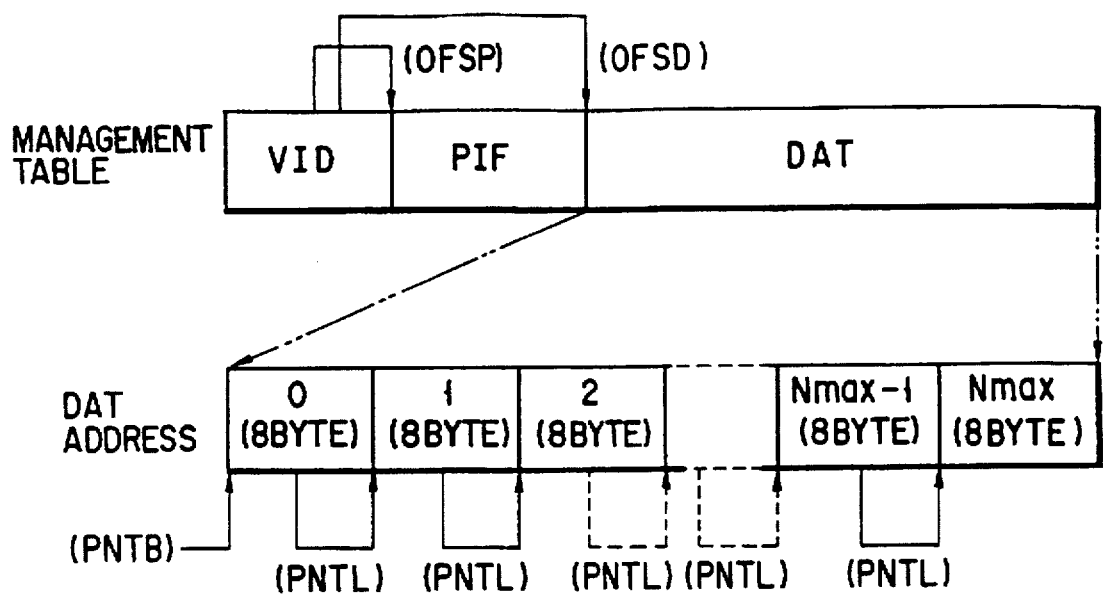
F I G. 6A
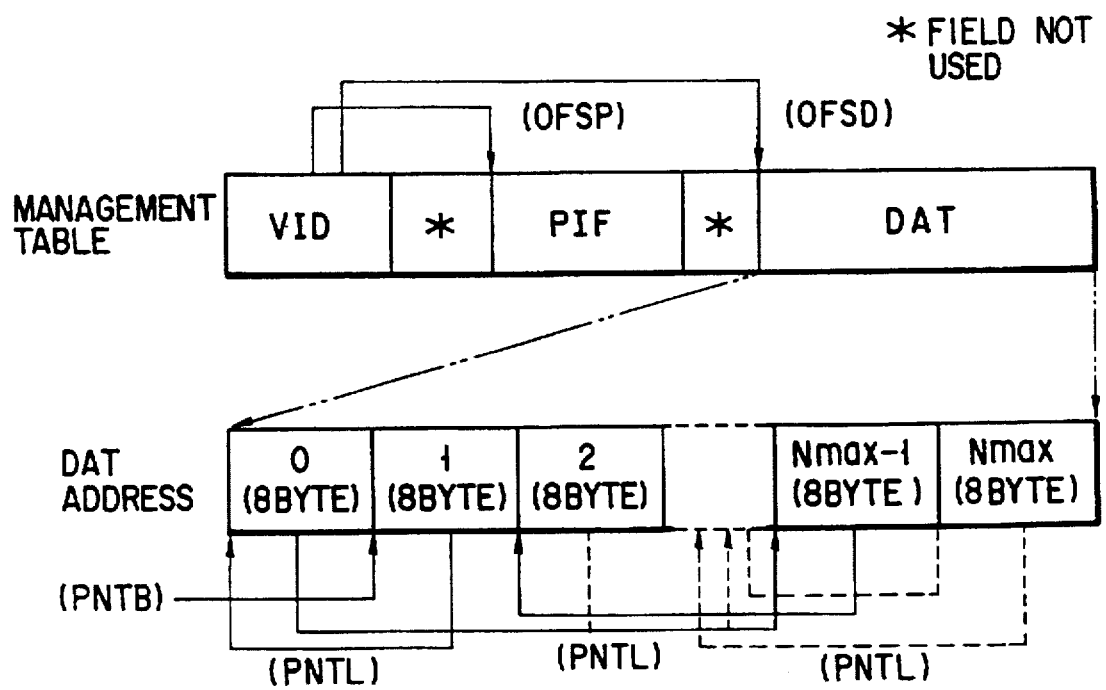
F I G. 6B

FIG. 8A CODE VIDEO DATA

| Frame No. | 0 | 1 | 2 | 3 | 4 | 5 | 6 | ... | 25 | ... | 30 |
|---|---|---|---|---|---|---|---|---|---|---|---|
| | SP1 | | | | | | SP2 | ----- | SP5 | ----- | |

GOP0 (frames 0-5), GOP4 (frames 25-30)

FIG. 8B CODE AUDIO DATA

| k-1 | k | k+1 | k+2 | k+3 | k+4 | k+5 | k+6 | ----- | k+n | |

FIG. 8C ADDITIONAL DATA

| SP1=k-1<br>#615 | SP2=k+6<br>#12 | ----- | SP5=k+n<br>#920 |

DATA UNIT

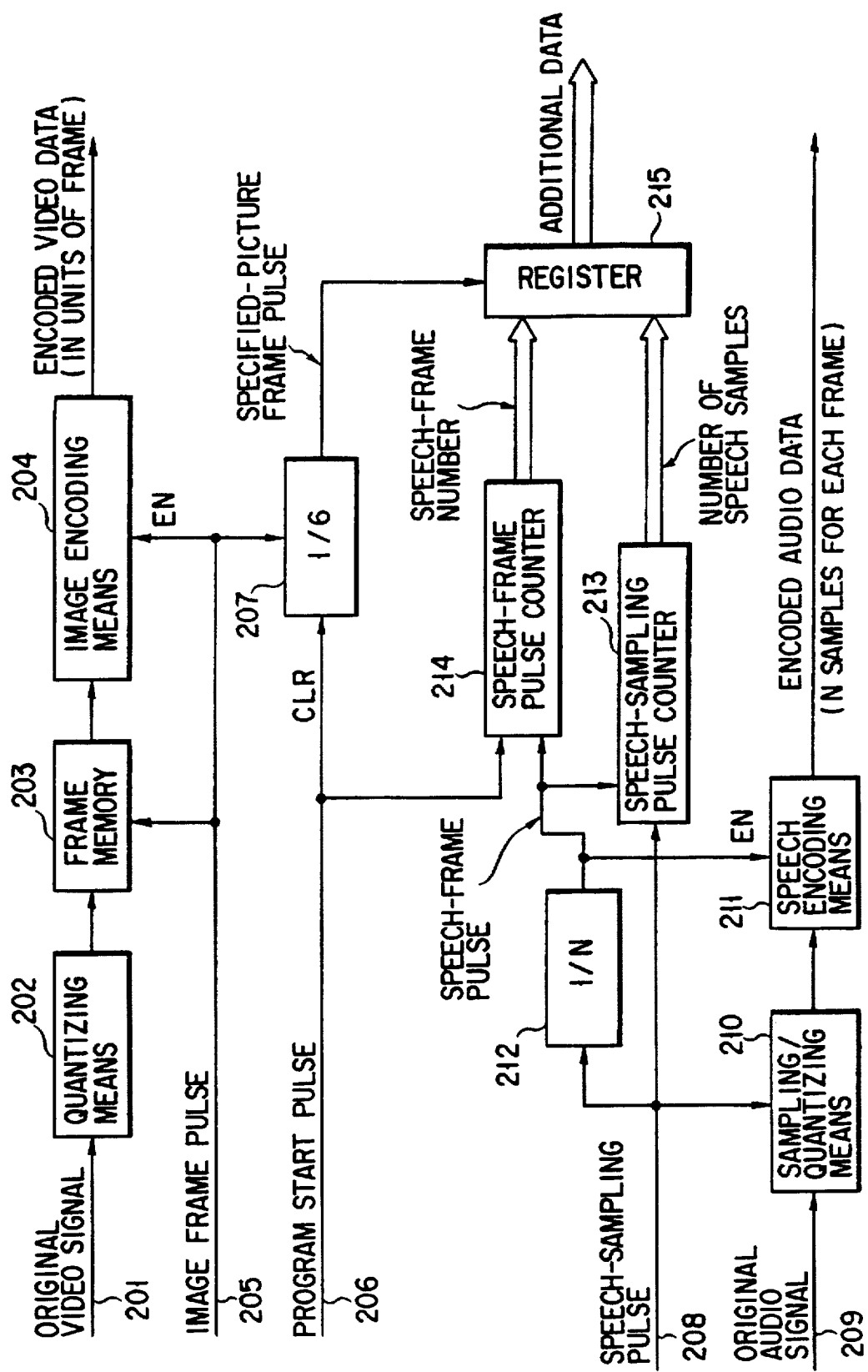
F I G. 9

| ITEM | NUMBER OF BYTES |
|---|---|
| PROGRAM NUMBER | 2 BYTES |
| PROGRAM TIME | 2 BYTES |
| DATA-UNIT SIZE | 4 BYTES x 3 SETS |
| STARTING POSITION OF VIDEO DATA | (4 BYTES x 2) x 3 SETS |
| STARTING POSITION OF AUDIO DATA | (4 BYTES x AUDIO-DATA STRINGS) x 3 SETS |
| IMAGE-SPEECH SYNCHRONIZATION DATA | (2 BYTES x 2 x AUDIO-DATA STRINGS) x 3 SETS |
| STARTING POSITION OF SUB-VIDEO DATA | 2 BYTES SUB-VIDEO CHANNELS |

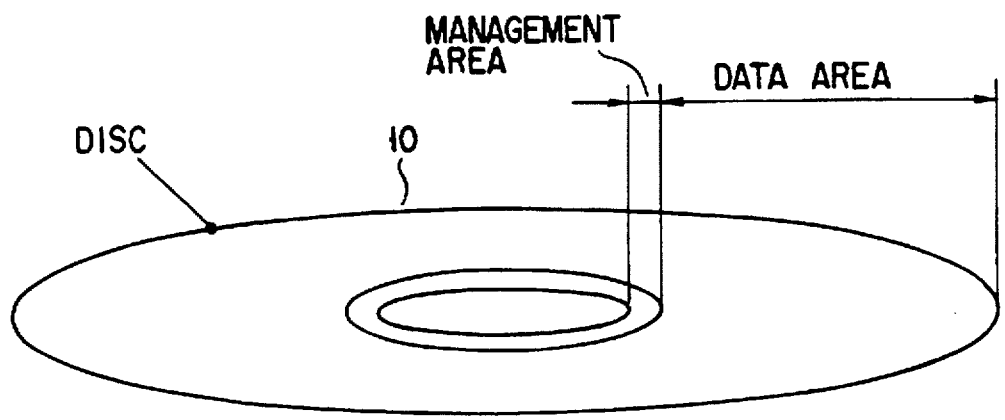
F I G. 15A
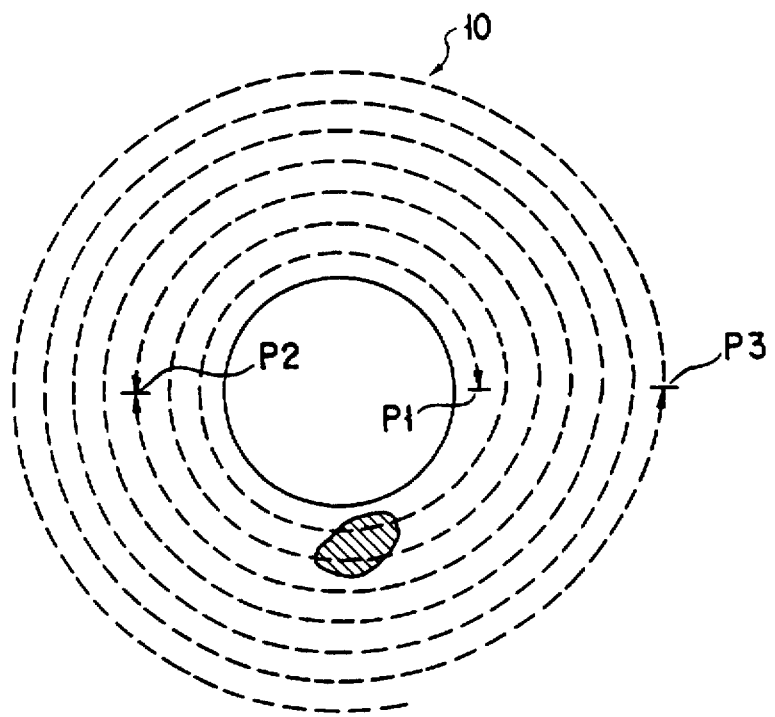
F I G. 15B

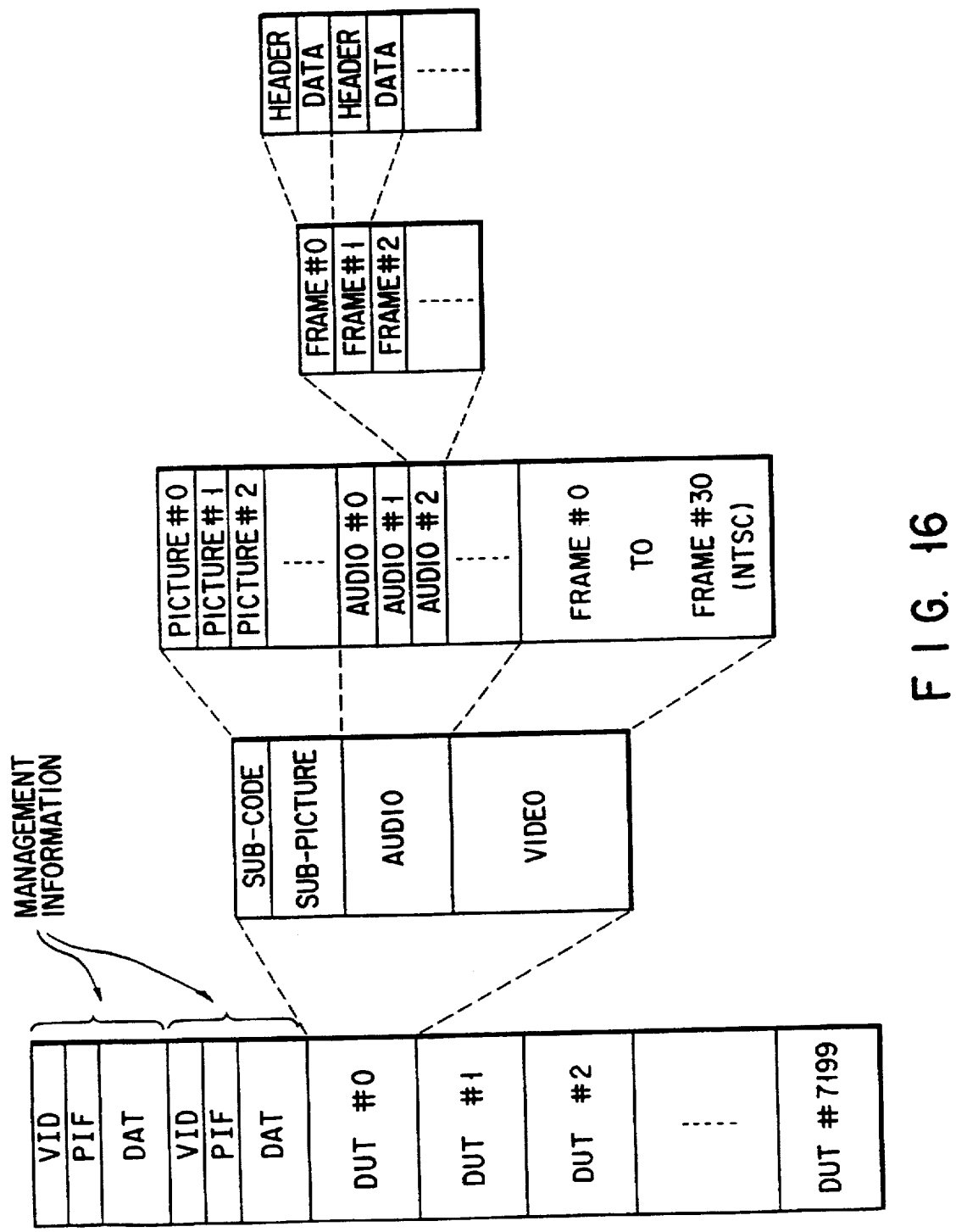
F I G. 16

| DESCRIPTION CODE | LANGUAGE CODE |
|---|---|
| 0 | NON-LANGUAGE |
| 1 | ENGLISH |
| 2 | JAPANESE |
| 3 | FRENCH |
| 4 | GERMAN |
| ⋮ | ⋮ |

FIG. 17A

| DATA-STRING NUMBER | DESCRIPTION CODE |
|---|---|
| #0 | 1(D1+B&M) |
| #1 | 3(D3) |
| #2 | 2(D2) |
| #3 | 0(B&M) |
| ⋮ | ⋮ |

FIG. 17B

| DESCRIPTION CODE | MEANING |
|---|---|
| 0 | B&M |
| 1 | D1+B&M |
| 2 | D2 |
| 3 | D3 |
| ⋮ | ⋮ |
| 7 | D7 |

FIG. 17C

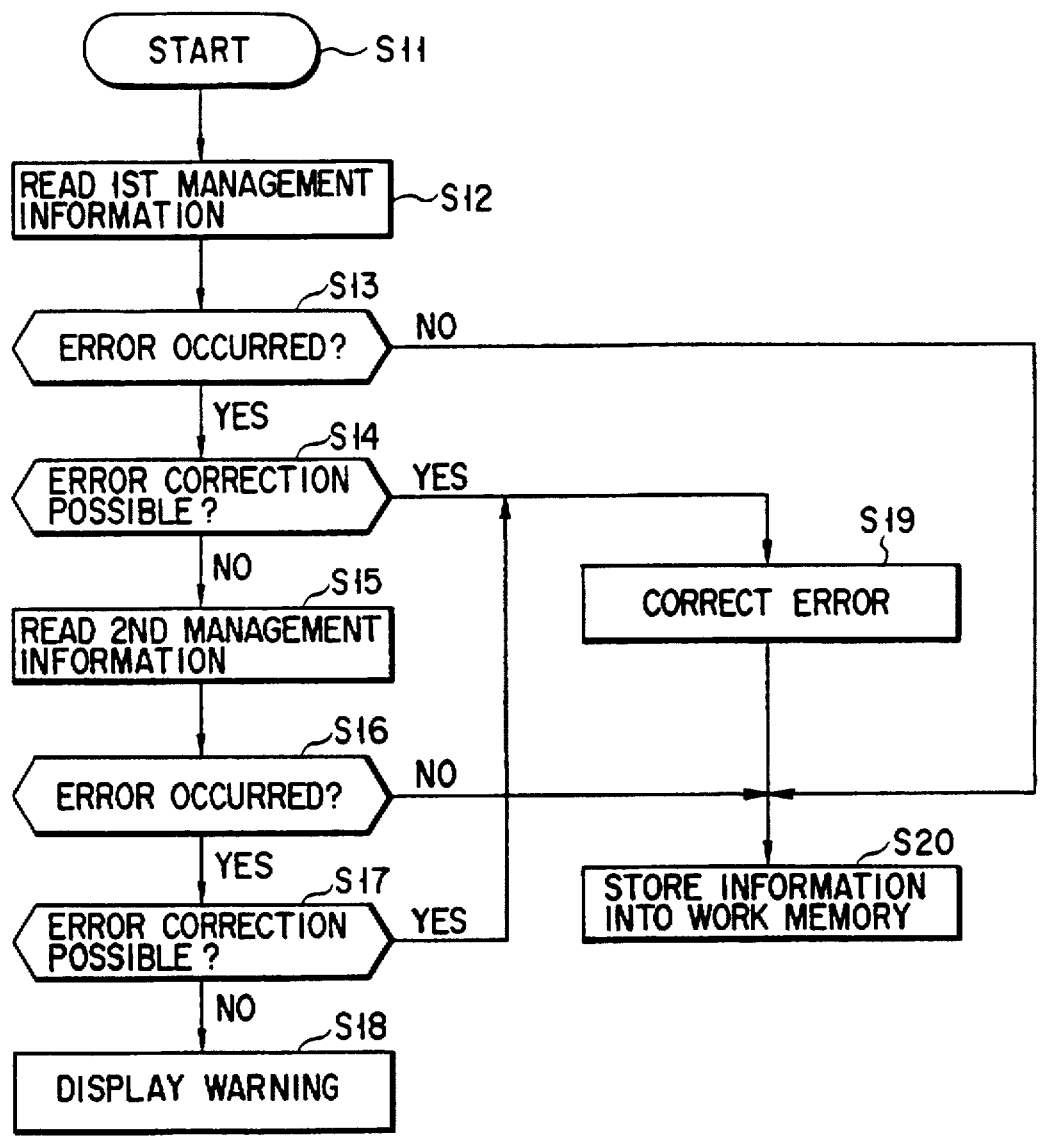
F I G. 18

APPARATUS FOR PROCESSING COMPRESSED VIDEO SIGNALS WHICH ARE BE RECORDED ON A DISK OR WHICH HAVE BEEN REPRODUCED FROM A DISK

BACKGROUND OF THE INVENTION

1. Field of the Invention

The present invention relates to a disk such as a writable and readable magnetic disk or a writable and readable optical disk, and also to an apparatus for processing compressed video signals, which can effectively operate in a recording/reproducing apparatus using a magnetic disk, an optical disk or a CD-ROM as a recording medium.

2. Description of the Related Art

In recent years, magnetic disks and optical disks have been used in various information systems as recording media for storing a great amount of data. A number or programs can now be stored on a magnetic disk or an optical disk, thanks to the recent progress in the technology of code-compressing video data at a high ratio. Various systems for compressing moving-picture data are known. One example is the system which is defined in ISO-11172 (MPEG).

It is expected that recording/reproducing apparatuses using disks as recording media will be used in increasing numbers.

To record more data on a disk, it is desirable not only to record signals which have been generated by compression-coding or variable-length coding by means of the moving-picture compression, but also to increase the recording density of the data-recording region of a disk. There is a demand for a technique of reproducing such signals from a disk in a special manner and a technique of searching them at high speed. When a video signal is coded by moving-picture compression, the video signal and an audio signal, which constitute the total video signal, must be synchronized.

If a disk is damaged or stained with dirt, a reproducing apparatus will not be able to read the important information from the disk. Once the table of information for managing the programs recorded on the disk has been destroyed, the apparatus can no longer reproduce the important information from the disk.

SUMMARY OF THE INVENTION

Accordingly, the first object of the present invention is to provide an apparatus for processing compressed video signals which can record data efficiently, which can easily manage data, which can reproduce programs in a special manner and search them at high speed, and which can synchronize a video signal and an audio signal by using simple means.

The second object of the present invention is to provide a disk which can minimize the possibility that important information to be used in the apparatus is destroyed completely when the disk is damaged.

According to a first aspect of the invention, there is provided an apparatus for generating compressed signals, which comprises: image grouping/compressing means for processing video data into groups, each consisting of video data items or frames which correspond to a predetermined reproducing time, and for compressing and encoding the video data items of each group; speech grouping/ compressing means for processing audio data corresponding to the video data into groups, each group consisting of audio data items, and for compressing and encoding the audio data items of each group; and a formatter for combining a plurality of groups of compressed and encoded video data items, which have been supplied from the image grouping/ compressing means, into a video-data packet, for combining a plurality of groups of compressed and encoded audio data items, which have been supplied from the speech-grouping/ compressing means, into an audio-data packet, for combining at least the video-data packet and the audio-data packet into a data unit, and for supplying the data unit to a recording system or a transfer system.

According to a second aspect of this invention, there is provided an apparatus for reproducing compressed signals from a data unit (DUT) comprised of video data groups, each consisting of compressed and encoded video data items or frames which correspond to a predetermined reproducing time; audio data groups corresponding to the video data groups, each consisting of compressed and encoded audio data items; and sub-video data groups corresponding to the video data groups each consisting of compressed and encoded sub-video data items. This apparatus comprises: a speech decoder for separating the audio data groups from the data unit and decoding the audio data groups, thereby generating decoded audio data; an image decoder for separating the video data groups from the data unit and decoding the video data groups, thereby generating decoded video data; a sub-image decoder for separating the sub-video data from the data unit and decoding the sub-video data, thereby generating decoded sub-video data; and data synthesizing means for combining decoded the decoded video data generated by the image decoder and the decoded sub-video data generated by the sub-image decoder.

According to a third aspect of the present invention, there is provided an apparatus for managing compressed signals, which comprises memory means for storing program information recorded on a recording medium, the program information forming a data allocation table which consists of numbers assigned to tracks on the recording medium, numbers assigned to zones forming each track, numbers assigned to sectors forming each track, and a link pointer of a data unit to be reproduced next.

According to a fourth aspect of the invention, there is provided an apparatus for synchronizing compressed signals which comprises an encoder section and a decoder section. The encoder section comprises: image grouping/ compressing means for encoding a predetermined number of image frames which corresponds to a predetermined reproducing time of an original image, thereby generating encoded video data items, and for combining the encoded video data items into a video packet; speech grouping/ compressing means for processing encoded audio data corresponding the packet of encoded video data items, thereby generating speech frames, and for combining the speech frames into a audio packet; additional data generating means for generating additional data consisting of a speech frame number assigned to a speech frame included in the audio packet which represents an original speech frame corresponding to a start timing of a specified image frame included in the video packet; and a formatter for combining the additional data, the audio packet and the video packet into a data unit. The decoder section comprises: decoding means for decoding the encoded video data, encoded audio data and additional data of each data unit; and output timing setting means for setting timing of outputting a first specified image frame when a speech frame number contained in the encoded audio data coincides with a speech frame number contained in the additional data.

According to a fifth aspect of the invention, there is provided a disk structure having a management area on a central portion and a data area surrounding the management areas, wherein identical management data items are recorded in the management areas, data to be accessed based on the management data item is recorded in the data area, and the starting positions of the identical management data items are set on different radial lines spaced apart by different angles.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a diagram schematically representing coded data generated in a first embodiment of the invention;

FIG. 1B is a diagram schematically showing an output image obtained by decoding the coded data shown in FIG. 1A;

FIG. 1C is a diagram illustrating the format of compressed signals generated in the first embodiment of the invention;

FIG. 2A is a diagram schematically representing coded data generated in the second embodiment of the invention;

FIG. 2B is a diagram schematically showing an output image obtained by decoding the coded data shown in FIG. 2A;

FIG. 2C is a diagram illustrating the format of compressed signals generated in the second embodiment of the invention;

FIG. 3A is a diagram schematically representing coded data generated in a third embodiment of the invention;

FIG. 3B is a diagram schematically showing an output image obtained by decoding the coded data shown in FIG. 3A;

FIG. 3C is a diagram illustrating the format of compressed signals generated in the third embodiment of the invention;

FIG. 5A shows the management table recorded in the management area of the disk;

FIG. 5B is a table showing the contents of 16 bytes in the program information field (PIF) on the disk;

FIG. 5C is a table showing the structure of the DAT;

FIG. 6A is a diagram representing the address arrangement of the management table shown in FIG. 5A, particularly the address arrangement of the DAT;

FIG. 6B is a diagram showing an example of an address arrangement which the management table may assume;

FIG. 8A is a diagram showing the format of encoded video data;

FIG. 8B is a diagram representing the format of encoded audio data;

FIG. 8C is a diagram showing the format of encoded additional data;

FIG. 9 is a block diagram showing an example of the encoder incorporated in the system for processing the data units shown in FIGS. 8A, 8B and 8C;

FIG. 15A is a perspective view of the disk according to the present invention;

FIG. 15B is a diagram illustrating the spiral track formed on the disk;

FIG. 16 is a diagram showing the contents of data unit DUT #0 recorded in the data area of the disk;

FIG. 17A illustrates the table recorded in the volume identity field (VID) on the disk and showing the correspondence between description codes and language codes;

FIG. 17B shows the table recorded in the PIF on the disk;

FIG. 17C is a table showing the meaning of each description code; and

FIG. 18 is a flow chart explaining the operation of the data-string processing section of the apparatus shown in FIG. 12.

DETAILED DESCRIPTION OF THE PREFERRED EMBODIMENTS

Figures 4A, 4B:
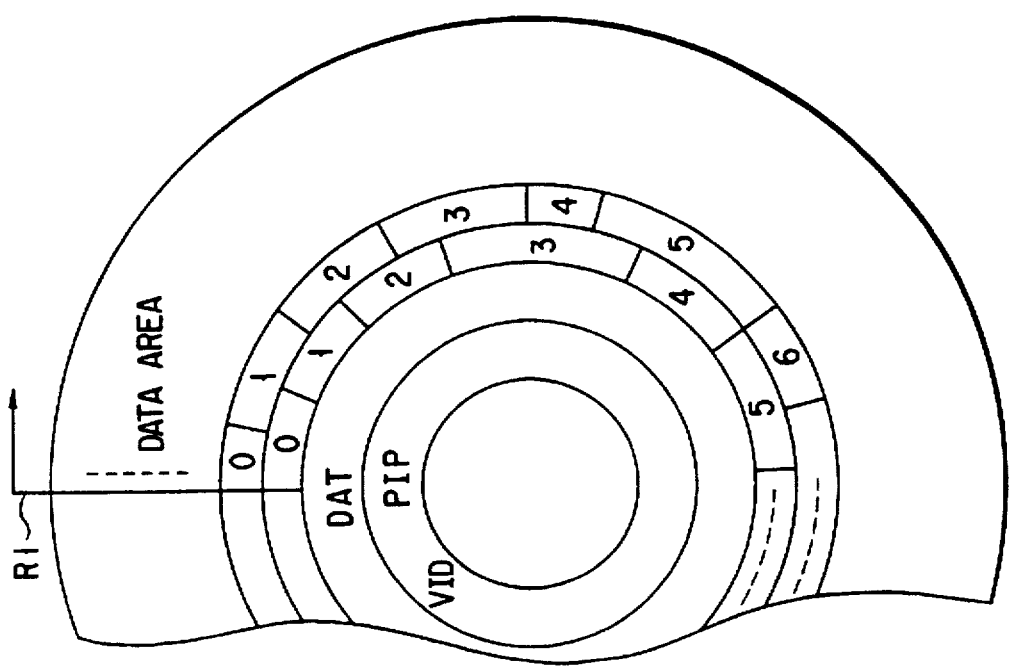
FIG. 4A is a diagram showing the management area and data area of a disk according to the present invention.
FIG. 4B shows the data unit allocation table (DAT) on the disk shown in FIG. 4A.

Embodiments of the present invention will now be described, with reference to the accompanying drawings.

The moving-picture compression format used in the present invention will be first explained. To encode video data, groups of pictures (GOPs) are combined, forming a packet, and audio data (for approximately 1.0 second) and expansion data, both for the packet, are encoded. The data thus encoded is added to the compressed video data, forming a data unit. Each GOP is fixed in the same program. A speech synchronizing time code is arranged as the header (i.e., the first part of the data unit), and sub-video data is arranged next to the header.

FIG. 1A shows an example of the encoded data, and FIG. 1B shows the output image obtained by decoding the encoded data. In FIGS. 1A and 1B, I indicates the video data encoded in a frame, P the video data encoded by forward prediction, and B the video data encoded by bidirectional prediction. In this mode, the components I, P, B, P and B of the video data are encoded repeatedly in the order they are mentioned. As a result, the length of the encoded data differs, from frame to frame. With such a format, reproducing only I provides a sextuple-speed image, and reproducing I and P generates a double-speed image. The actual multiple speed is limited by the speed at which the data is read from a disk. This format is suitable for a high-speed transfer rate, a large recording capacity, and semi-random access. In this example, as shown in FIG. 1C, six frames form a GOP, and five GOPs form a packet. It takes one second to reproduce this packet from the disk. The actual length of recorded signals on the disk differs from packet to packet, since the signals are encoded by moving-picture compression techniques.

Therefore, a packet consists of 30 frames (=5 GOPS×6 frames/GOP). Each set of 30 frames of audio data is recorded in 48K bytes (=4 ch×12K bytes/s). In the case where two channels are used simultaneously, the minimum memory capacity required is only 24K bytes.

The primary data item and the data rate for each data unit to be recorded on the disk are as follows:

Expansion data=128K bits/s=16K bytes/s
Audio data=384K bits/s=48K bytes/s
Image data=4096K bits/s=512K bytes/s The expansion data contains a header and sub-video data. The sub-video data can be used as, for example, subtitle data used in a movie. The header is individual management information in the data unit and contains image-speech synchronizing data. The sub-video data is updated in units of GOPs containing the corresponding main image. The image and speech are also synchronized in units of GOPs, and the synchronization is corrected in units of GOPs, too.

For subtitle data, a plurality of channels may be provided for the sub-video data so that two types of sub-images can be output as, of example, an English scenario and Japanese subtitles on a foreign film. If the allocated rate of the sub-video data is 64K bits/s, and if the recording time of one packet is 1.0 second, the buffer memory capacity for holding the sub-video data will be approximately 64K bits. The buffer memory capacity needed for two channels of sub-image may be 32K bits.

Once the video data, the audio data, and the expansion data have been encoded, they are completed within the data unit and are totally independent from other data units.

On the disk there is provided a management area. Each data unit is read in accordance with the data recorded in the management area. Since each data unit is processed independently of any other data unit, it can be easily edited and accessed.

The relationship between the data area and the associated management information will be described.

In the actual layout, a byte align process is performed for each GOP, and a sector align process is always carried out for each data unit to make it easy to segment the data unit. Due to the sector align process performed, the actual recording capacity of the disk is reduced. In the case where the display frame rate is 30 frame/sec, each GOP consists of six pictures (frames), and each data unit consists of five GOPs, the sector align process is performed for every data which corresponds to 1.0 second of a program. Therefore, a disk recording a 120-minute program has its recording capacity reduced by 7200 sectors. This reduction is 0.2% for a disk whose total recording capacity is 346,752 sectors each capable of storing 1KB of data.

In a reproducing operation, the image is decoded, beginning with the first frame (I picture) of the GOP. The speech is decoded, beginning with the speech frame specified by the image-speech synchronization. At the time when the decoding of both of the specified speech frame and the start frame of the image GOP has been completed, the image and the specified speech sample start to be outputted simultaneously.

For audio data, approximately 1.0 second of encoded audio data is inserted in the data unit. After a certain number of samples are grouped into a block, with the adjacent block edges tucked in a bit, the speech is encoded in units of this number of samples, and a header is added to the encoded speech to form an encoded speech frame.

The length of speech frame is less than the length of 2048 samples of the original speech, and corresponds to 24 ms to 36 ms in terms of the duration of the original speech. The encoded data amount of the speech frame ranges from 288 bytes to 576 bytes. A frame ID is added to the header of each speech frame in each speech channel. The frame ID is made up of 24 bits, 4 bits of which represent a speech channel and 20 bits indicate a speech frame number. The approximately 1.0 second of audio data is usually as long as several tens of speech frames, though the length varies with the number of samples in a block and the sampling frequency. The image synchronization specifies the frame number of the encoded speech, where the decoded speech sample is outputted with the start frame of the corresponding GOP at the same time, and the speech sample number in the frame. The time code consists of 32 bits, 20 bits of which represent a speech frame number and the remaining 12 bits of which specify a speech sample number. This enables the maximum error in the speech and image synchronization in the entire system to coincide with half the sampling period of the speech. When fs=32 KHz, the maximum speech synchronization error is approximately 16 us.

FIGS. 2A to 2C shows an another example of a moving-picture compression format, and FIGS. 3A to 3C shows still another example of a moving-picture format.

The management information recorded in the management area will be explained below. The management data is recorded in the form of a table.

In the embodiments described above, each data unit consists of two or more GOPs. Instead, according to the present invention, each data unit may contain only one GOP.

As shown in FIG. 4A, the management table contains a volume identity field (VID) around the innermost track, a picture information field (PIF) surrounding the VID, and a data unit allocation table (DAT) surrounding the PIF. The VID is written, starting at the first byte in the management table area, and indicates information on various elements throughout the disk by using 256 bytes. For example, this information includes data as to whether the disk is for general recording or for reproduction only. In the picture information field (PIF), various pieces of data on each program are recorded. For example, 16 bytes are used for each program.

FIG. 5B shows an example of the contents of 16 bytes stored in the PIF.

ATMB is the absolute time of the starting point of the present program in the volume. In the case of time code search, each item of ATMB data is checked in the order of reproducing programs to find the number of the program in which a desired time code is present. Each DAT (to be described later) in the corresponding program is checked. Then, the sum of the program time (PTMB, to be described later) and the ATMB is compared with the desired time code value to find the DAT to which the corresponding time code belongs. In this procedure, searching can be effected. By the method based on the absolute starting time, the user can know the absolute starting time from the desired program and can, therefore, obtain a specific item of PIF data by searching for the ATMB corresponding to the absolute starting time.

PINF indicates program attributes which are allocated to each program. Among the program attributes are a copy disable flag (CPNH), a program type (PTYPE), a write attribute (PWRT), and the number of GOPs forming a data unit (SGDU). If the CPNH is set at 1, it means copy disable and if it is set at 0, it means copy enable. The PTYPE, which consists of three bits, indicates such types as the home video, movie, music, kara-OK, computer graphics, interactive use, game, computer data, or program. When the PWRT has a value of 1, it means write enable.

The PIF also includes the parameters as shown in FIG. 5B, in which AINF identifies a speech encoding system, VINF denotes the identification of an image encoding system, ATRT represents the picture attributes (i.e., data for identifying the aspect ratio and a system such as the PAL or the NTSC system), and HRES and VRES indicate the data on horizontal resolution and vertical resolution, respectively.

PNTB indicates a start pointer that has a value indicating the DAT address (data unit number) at which the data unit at the program starting point is stored. Once the DAT address (data unit number) has been determined, it is possible to identify the position of the start sector of a program on the data area.

PGML indicates the program number to be processed immediately after the current program is finished, when related programs are present. Namely, the order in which programs are produced does not necessarily coincide with the order of program numbers. When the current program is the last program, there is no link destination and all bits of the PGML are "1".

FIG. 5C shows the structure of the DAT. In this table, there are parameters such as a zone number (NZON), a sector number (NSTC), and a track number (NTRC) on a disk, as well as a program time (PTMB), and a link pointer (PNTL).

NZON is the zone number to which the recording sector at the start of the data unit belongs. The disk is divided in units of tracks in the radial direction, from the innermost circumference, and the zone numbers are allocated in sequence. Specifically, as shown in FIG. 4A, the data area has a reference position R1 on the disk and the numbering begins with 0 at this position. NSTC indicates a sector number in a zone. The sector number is not a serial number associated with another track or zone but a number complete only in the track or zone. NTRC indicates the number of the track in which the zone and the sector number (the header of the data unit) exist. PTMB is a flag representing the time position data on the video data (I picture) at the start of the data unit. The position data indicates a time (in seconds) elapsed from the program starting point. The time position data is used in searching for time codes explained earlier. Further, the time position data is taken in the reproducing apparatus, which uses it as the start reference data in order to display the program time, absolute time, remaining time, etc.

PNTL is a flag showing a subsequent data unit immediately following the present DAT unit number in time. The unit corresponds to the data unit number. When there is no link destination at the program end, all bits are set at 1 (=0xFFFF). The effective value for the link pointer ranges from 0x0000 to 0xFFFF.

FIG. 4B graphically shows the management area and data area. The blocks in the data area each indicate programs. The DAT unit numbers are continuous in this order: 0 to Nmax. The first DAT unit number is determined by referring to the PNTB in the PIF. If the DAT unit number is 1, then the next link pointer will be 0. The link pointer of DAT unit number 0 is Nmax—1. The link pointer of DAT unit number Nmax −1 is 2. By checking for the zone number, the sector number, and the track number according to the change of the DAT unit number, it is possible to obtain data on the reproduction order such as track 4 in sector 3 in zone 1, track 7 in sector 2 in zone 0, and track 10 in sector 30 in zone 3.

FIG. 6A represents the address arrangement of the management table shown in FIG. 5A, particularly the address arrangement of the DAT.

FIG. 6B shows another address arrangement which the management table may assume and in which fields not used are provided among the VID, the PIF and the DAT. In the address arrangement of FIG. 6B, an address offset will occur when the data search is switched from the VID to the PIF. The offset data is contained in the data recorded in the VID and will be recognized when a drive control MPU executes an address management program.

The recording capacity of the management table will be calculated.

The capacity for recording the management table depends on the number of programs and the number of data units which are recorded on the disk. Assuming that 256 programs and 7200 data units (1 sec/unit, corresponding to 2 hours), the data for the management table amounts to 61952 bytes (=256+(16×256)+(8×7200). Namely, in a system wherein a data unit corresponds to about 1 second, management information for 2 hours can be recorded in a 63KB memory. In other words, a 63KB memory is practically sufficient for storing the entire management table.

The physical position of the start sector of the management table is usually defined by ZONE=0, TRACK=0 and SECTOR=0. To protect data, a plurality of management tables may be recorded in different physical regions. The management table is frequently referred to during data access. It takes much time to access to the table recorded on the disk. To reduce the access time, the management table may be mapped in the work RAM incorporated in the drive control MPU. However, the memory cost will be too much for the apparatus cost if the table is excessively large, and a great number of operations must be performed to convert the management table into desired parameters if the management table is not appropriately formulated. In view of this it is desirable to set the system of the apparatus in accordance with the apparatus cost and the amount of the table.

Figure 7:
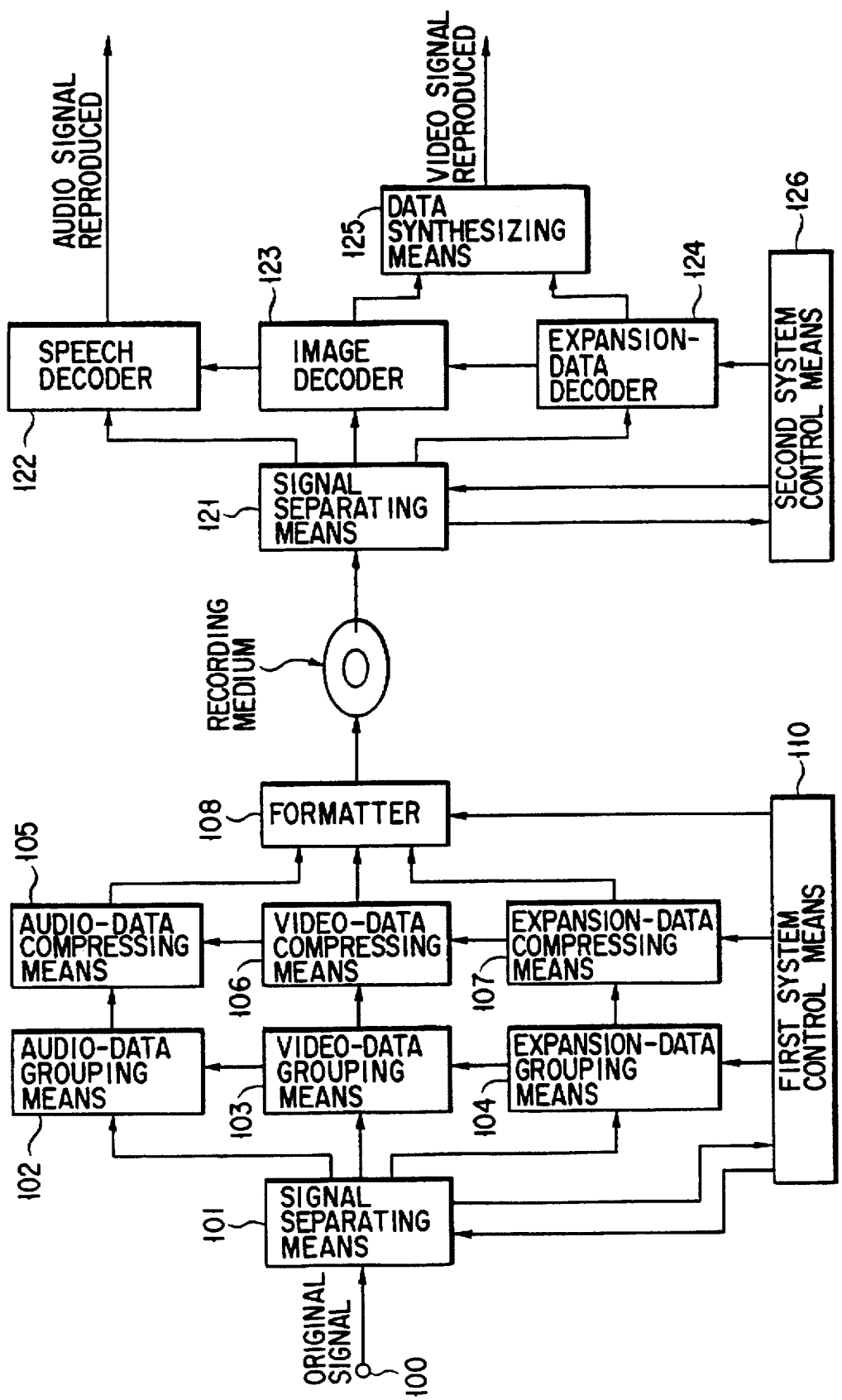
FIG. 7 is a block diagram showing the first embodiment of the invention.

FIG. 7 shows the encoder and decoder incorporated together in a block diagram showing an apparatus for processing compressed video signals, which is a first embodiment of the invention. In operation, an original signal is input to an input terminal 100 and hence to signal separating means 101. The signal separating means 101 separates the original signal into audio data, video data, expansion data (e.g., subtitle data), a sync signal, and the like. The audio data is input to speech-data grouping means 102, the video data to image-data grouping means 103, the expansion data to expansion-data grouping means 104, and the sync signal to first system control means 110. While being set in mode 1, the first system control means 110 controls the image-data grouping means 103 such that the means 103 forms groups of video data, each consisting of six frames, controls the speech-data grouping means 102 such that the means 102 forms groups of audio data in units of time of mode 1, and controls the expansion-data grouping means 104 such that the means 104 forms groups of expansion data which correspond to the frames. The groups of video data are input to image-data compressing means 106, which encodes and compresses the video data in the way explained with reference to FIGS. 1A, 1B and 1C. The groups of audio data are input to speech-data compressing means 105, which encodes and compresses the audio data. The groups of expansion data are input to expansion-data compressing means 107, which encodes and compresses the expansion data. The data output from the data compressing means 105, 106 and 107 are input to a formatter 108. The formatter 108 collects five GOPs (i.e., groups of encoded picture data items), thereby forming a data unit of the type shown in FIG. 1A. The data unit consists of encoded audio data, encoded expansion data and a header (i.e., additional data). Each data compressing means is controlled so as to generate encoded data, the amount of which is an integral multiple of the maximum amount of data that can be recorded in one sector of a recording medium.

Data units output from the formatter 108 are recorded on the recording medium or supplied to a data transfer system. The signals are read from the recording medium or transferred from the data transfer system and then supplied to signal separating means 121. The signal separating means 121 extracts the encoded audio data, the encoded video data, the encoded expansion data and the header from each data unit. The encoded audio data is supplied to a speech decoder 122, which decodes the data, thereby reproducing an audio signal. The encoded video data is supplied to an image decoder 123 and decoded. The encoded expansion data is supplied to an expansion data decoder 124 and decoded. The decoded video data and the decoded expansion data are supplied to data synthesizing means 125, which synthesizes the video data and the expansion data, thereby reproducing a video signal. The data contained in the header is input to second system control means 126 and used to generate timing signals and to achieve image-speech synchronization and mode-setting.

The apparatus shown in FIG. 7 is characterized by specific means of achieving image-speech synchronization.

The data unit will be described again, in greater detail.

As has been described above, one packet of video data consists of 30 frames (=5 GOPs×6 frames/GOP), and 30 frames of audio data, forming one set, and are recorded in 48K bytes (=4 ch×12K bytes/s) while the apparatus is being set in mode 1. When two channels are used simultaneously, the minimum memory capacity required is only 24K bytes.

FIGS. 8A, 8B and 8C show the format of the encoded video data, the format of encoded audio data and the format of encoded additional data, respectively. The audio data has been encoded at a predetermined sampling frequency, and a prescribed number of sampled segments of data form a data block. A speech header is added to the data block, whereby the data block and the speech header constitute one frame. The speech header contains an frame ID which identifies the frame.

The header of the data unit contains additional data. The additional data includes data representing the relationship between the encoded video data and the encoded audio data. More specifically, the encoded video data contains an image frame number as shown in FIG. 8A, and the encoded audio data contains an speech frame number as illustrated in FIG. 8B. As shown in FIG. 8A, the first frame of the first GOP0 is a specified picture 1 (SP1), the first frame of the second GOP1 is a specified picture 2 (SP2), and so forth. The first frame of the last GOP4 is a specified picture 5 (SP5). (Each of these specified pictures is an intra-frame compressed data.) The frames k−1, k+6, . . . k+n of the encoded audio data correspond to SP1, SP2, . . . , and SP5, respectively. Data showing this relation between the SPs of the encoded video data, on the one hand, and the frames k−1, k+6, . . . k+n of the encoded audio data, on the other hand, is contained in the additional data, as can be understood from FIG. 8C. The additional data also contains data representing the sampling numbers of the frames k−1, k+6, . . . k+n. Therefore, the additional data indicates that SP1 corresponds to the frame k−1 of the audio data and has sampling number of #615, that SP2 corresponds to the frame k+6 of the audio data and has sampling number of #12, and that SP5 corresponds to the frame k+n of the audio data and has sampling number of #920.

The means for generating the additional data will be described below, with reference to FIG. 9.

FIG. 9 illustrates the means for generating the additional data. An original video signal is supplied to a terminal 201. The video signal is quantized by quantizing means 202 and input to a frame memory 203. The video signals read from the frame memory 203 are input to image encoding means 204. The image encoding means 204 encodes the signals, generating video data pieces which correspond to frames. The video data is supplied to a formatter (not shown), which generates video data of the format shown in FIGS. 1A, 1B and 1C. Meanwhile, a specified-picture frame pulse is supplied to an input terminal 205 and hence to the frame memory 203 and the image encoding means 204, serving as a write timing signal and a read timing signal for the frame memory 203 and also as a timing signal for the image encoding means 204. A program start pulse is supplied to an input terminal 206 and hence to a ⅙ frequency divider 207 and also to a speech frame pulse counter 214. This pulse clears a ⅙ frequency divider 207 which counts the image frame pulse, and generates a pulse for a specified-picture frame of the type shown in FIG. 8A. Upon receipt of the program start pulse, the speech frame pulse counter 214 starts counting speech-frame pulses.

In the meantime, a speech-sampling pulse is supplied to an input terminal 208, and an original audio signal is supplied to an input terminal 209. The original audio signal is sampled and hence quantized by sampling/quantizing means 210. The output of the sampling/quantizing means 210 is input to speech encoding means 211 and encoded into audio data. In a device (not shown) connected to the output of the speech encoding means 211, the speech-frame number generated by the speech frame pulse counter 214 is added to the header of the audio data output from the speech encoding means 211.

The speech-sampling pulse supplied to the input terminal 208 is input to an 1/N frequency divider 212 and converted into N speech frame pulses, so that each frame of audio data may be sampled with N sampling pules. The speech frame pulses are supplied to the speech encoding means 211, which encodes the speech data in units of frames. The speech frame pulses are supplied, as clock pulses, to a speech-sampling pulse counter 213. Each speech frame pulse clears the speech-sampling pulse counter 213. The output of the speech-sampling pulse counter 213, which represents the number of samples extracted from one frame of audio data, is input to a register 215. The speech-frame number is also input to the register 215. The speech-frame number has been generated by clearing the speech frame pulse counter 214, using a program start pulse and counting the speech frame pulses. Input to the register 215 are the speech-frame number and the number of speech samples. These data items are latched by a specified-picture frame pulse and subsequently output. The number of speech samples is cleared by a speech-frame pulse. Since the number of speech samples is latched by the specified-picture frame pulse while the number is increasing, the latched number of speech samples is used as a speech-sample number.

The additional data output from the register 215 is used by the formatter 108 to generate a data unit of the type shown in FIG. 1A.

Figure 10:
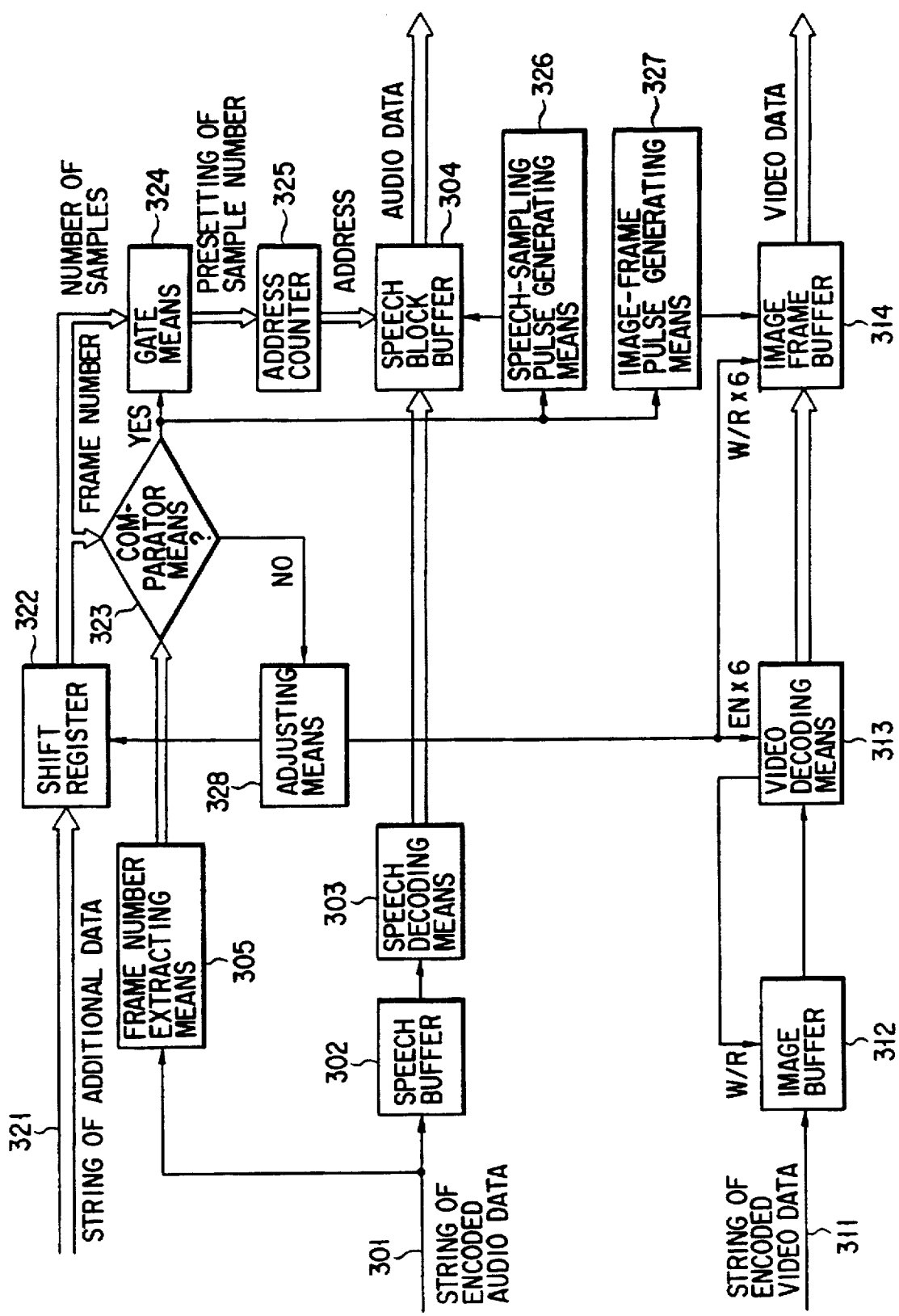
FIG. 10 is a block diagram showing an example of the decoder incorporated in the system for processing the data units shown in FIGS. 8A, 8B and 8C.

FIG. 10 shows the means for reproducing the additional data to accomplish image-speech synchronization.

The encoded video data, the encoded audio data, and the additional data are reproduced, unit by unit, from the recording medium (FIG. 7). The additional data defines the period during which the decoded video data and the decoded audio data are to be output. The encoded audio data read from the recording medium is input, unit by unit, to an speech buffer 302 via an input terminal 301 as shown in FIG. 10. The encoded video data read from the recording medium is input, unit by unit, to an imager buffer 312 via an input terminal 311. The additional data is input to a shift register 322 through an input terminal 321.

The encoded audio data is input to frame number extracting means 305, too. The encoded audio data output from the speech buffer 302 is input to speech decoding means 303 and decoded thereby in units of frames. The decoded audio data is input to a speech block buffer 304. The encoded video data output from the image buffer 312 is input to image decoding means 313 and decoded thereby in units of frames. The decoded video data is input to an image frame buffer 314. Blocks of decoded audio data are sequentially stored into the speech block buffer 304.

The speech-frame number extracted by the frame number extracting means 305 is input to comparator means 323, which compares the speech-frame number with the speech-frame number extracted from the header of the encoded audio data. If the numbers compared are identical, the comparator means 323 generates a coincidence pulse, which is supplied to gate means 324. Then, the sample number contained in the additional data is output through gate means 324 to the preset input of an address counter 325.

The sample number supplied to the address counter 326 designates the location in the speech block buffer 30 from which the decoded audio data is to be read. The coincidence pulse from the comparator means 323 is supplied to speech-sampling pulse generating means 326 and image frame pulse generating means 327. In response to the coincidence pulse, both pulse generating means 326 and 327 start performing their functions, whereby the audio data is output in synchronism with the video data, in accordance with the corresponding sample number whose relationship with the video data designated by the additional data.

If the numbers compared by the comparator means 323 are not identical, the comparator means 323 generates a non-coincidence pulse. Then, the additional data is shifted in the shift register 322 until the next synchronization data is read into the register 322. For example, when the comparator means 323 generates a non-coincidence pulse during the process wherein SP1=k+1, the additional data is shifted in the register 322 until the synchronization data SP2 (=k+6) is read into the register 322. The frame number, k+6, contained in the additional data is supplied to the comparator means 323, which compares this frame number with the frame number contained in the encoded audio data. If the frame numbers compared are identical, that is, if the comparator means 323 generates a coincidence pulse during the process wherein SP2=k+6, then the video data supplied to the image decoding means 313 and hence to the image frame buffer 314 is processed into decoded picture data of SP2. This synchronization is performed by an adjusting means 328. In this case the audio data is output in synchronism with the picture data of SP2 et seq.

The adjusting means 326 recognizes the image frame number, too, by using the output of the image decoding means 313.

Neither the video data nor the audio data, or only the video data, may be output until the comparator means 323 generates a coincidence signal. Once the means 323 has generated a coincidence signal, the comparator means 323 may be stopped, since the speech in a group of pictures is synchronous with the image in the same group of pictures. The comparator means may be periodically driven, each time in response to a specified-picture signal.

In the case where the speech frame number is found to be large when a non-coincidence pulse is supplied to the adjusting means 328, the process goes to the image frame of SP2 or SP4. Nonetheless, synchronization can be secured before the process goes to the image frame of SP3 since ordinary speech frames have a length of at most 2048 samples.

As described above, the timing of outputting video data from the image frame buffer 314 and the timing of outputting the audio data from the speech block buffer 304 are controlled for the purpose of synchronizing any specified-picture frame and a designated speech sample. For the same purpose, additional means may be used to adjust the time for storing decoded data into a buffer memory (not shown) or the time for storing encoded data into a buffer memory (not shown).

Figure 11:
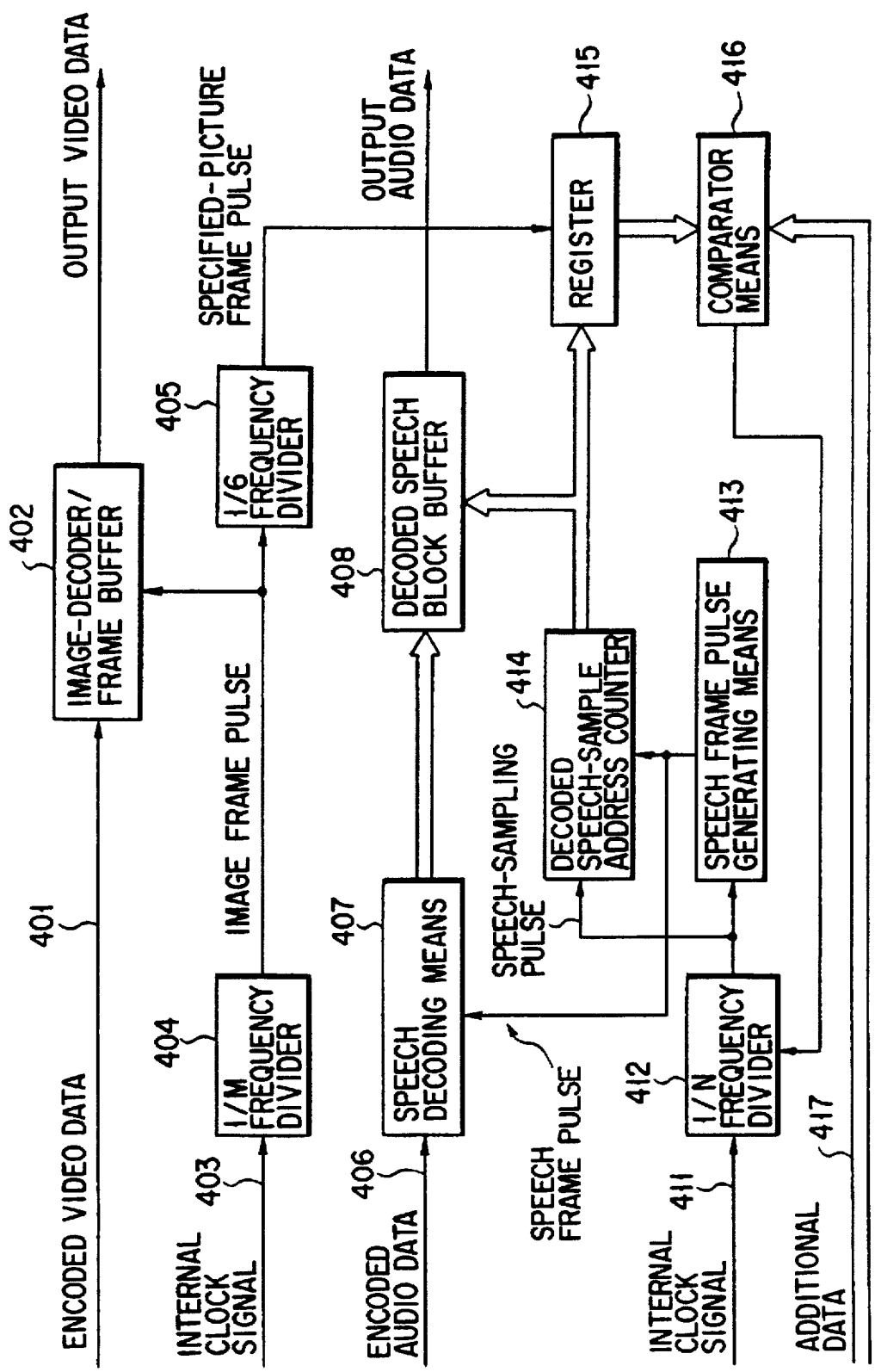
FIG. 11 is a block diagram showing another example of the decoder incorporated in the system for processing the data units shown in FIGS. 8A, 8B and 8C.

FIG. 11 shows another type of means for reproducing the additional data, thereby to accomplish image-speech synchronization.

As shown in FIG. 11, encoded video data is supplied to an input terminal 401 and decoded by an image decoder/frame buffer 402. An internal clock signal is supplied to an input terminal 403 and is frequency-divided by an 1/M frequency divider 404 into image frame pulses. These image frame pulses are supplied as timing signals to the image decoder/frame buffer 402. They are supplied also to a 1/6 frequency divider 405 and frequency-divided into specified-picture frame pulses which are synchronous with the specified-picture signals shown in FIG. 8A.

Encoded audio data is input via an input terminal 406 to speech decoding means 407 and is decoded thereby. The decoded audio data is input to a decoded speech block buffer 408. An internal clock signal is supplied through an input terminal 411 to an 1/N frequency divider 412 and frequency-divided into speech-sampling pulses. The speech-sampling pulses are input to speech-frame pulse generating means 413 and also to a decoded speech-sample address counter 414. The pulse generating means 413 generates speech frame pulses corresponding to speech frames. The speech frame pulses are supplied, as timing signals, to the speech decoding means 407 and the decoded speech-sample address counter 414.

The decoded speech-sample address counter 414 is reset by a speech frame pulse and counts speech-sampling pulses. Hence, the output of the address counter 414 represents a speech sample number. The speech sample number is used as a read address for the decoded speech block buffer 408, and is input to a register 415. The register 415 latches the speech sample number in response to a specified-picture frame pulse. The speech sample number, thus latched, is input to comparator means 416. The comparator means 416 compares the speech sample number with the speech sample number contained in the additional data supplied from an input terminal 417.

If the speech sample numbers compared are identical, this means that the video data and the audio data are synchronous in a prescribed relationship. If the speech sample numbers compared are not identical, this means that the speech frame designated by the additional data is not synchronous with a specified-picture signal. To render the speech frame synchronous with the specified-picture signal, the comparator means 416 supplies a divider-adjusting signal to the 1/N frequency divider 412, thereby controlling the phase of the speech-sampling pulses and that of the speech frame pulses. In effect, the divider (N) of the 1/N frequency-divider is increased or decreased by 1 to 2. As long as the difference between the two speech sample numbers compared by the comparator means 416 falls within a predetermined range, the video data and the audio data are maintained synchronous with each other.

Instead of adjusting the divider of the 1/N frequency divider 412, the divider (M) of the 1/M frequency divider 404 may be adjusted in order to render the video data and the audio data synchronous. Alternatively, the dividers of both frequency dividers 404 and 412 may be adjusted for the same purpose. No matter whether either the divider (M) or the divider (N), or both, are adjusted, the video data and the audio data can be synchronized before they become excessively asynchronous, despite that the frequency of the encoding clock signal differs, though slightly, from the frequency of the decoding clock signal.

As described above, with the present invention it is possible to record data efficiency, to manage data easily, to reproduce programs in a special manner and search it at high speed, and to accurately synchronize video data and audio data.

The present invention is not limited to the embodiment described above.

Figure 12:
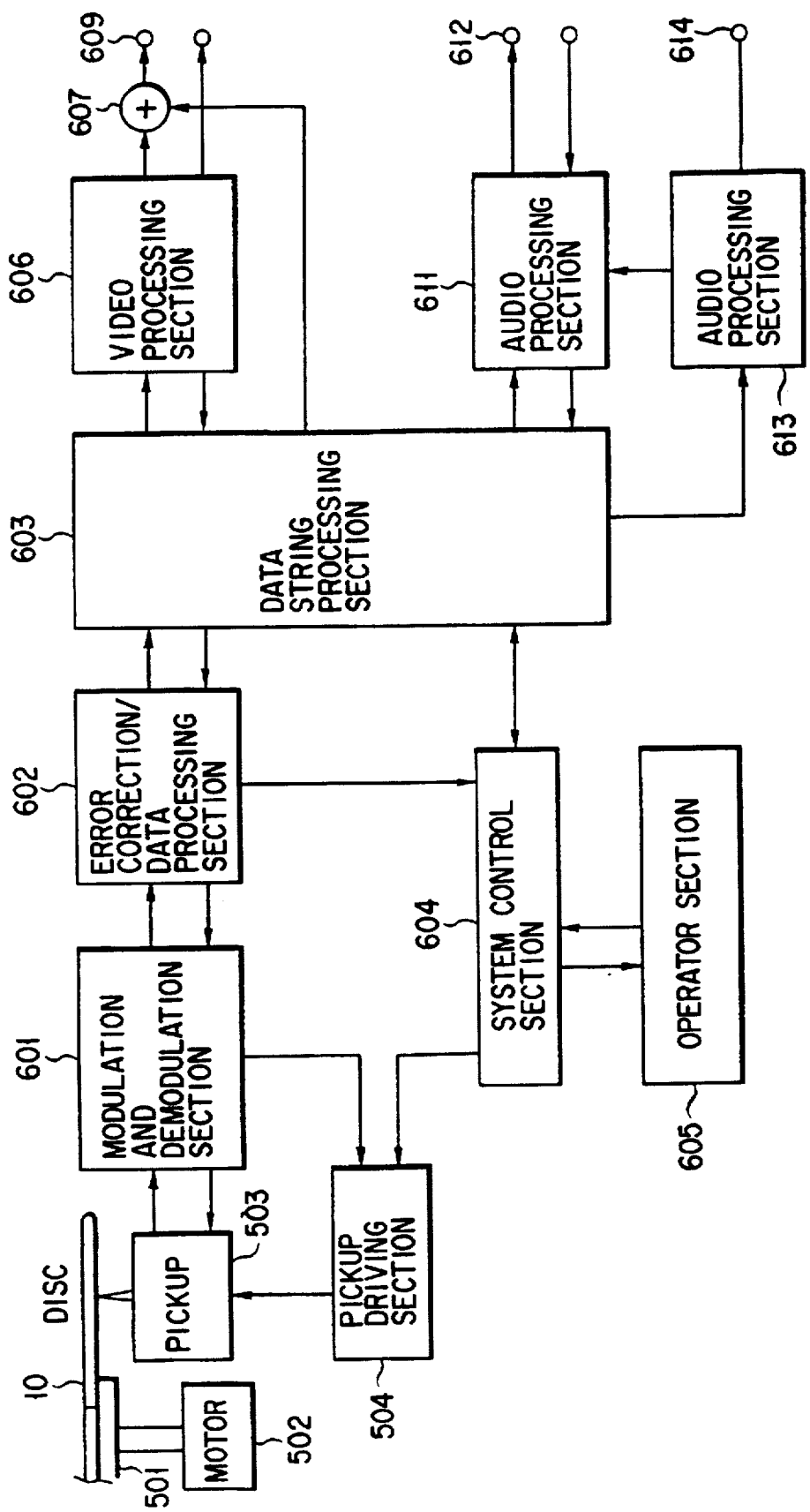
FIG. 12 is a block diagram illustrating a recording/reproducing apparatus which is a second embodiment of the present invention.

FIG. 12 shows a recording/reproducing apparatus which is a second embodiment of the present invention. The reproduction system of this apparatus will be described below.

A disk 10 is placed on a turntable 501, which is rotated by a motor 502. In the reproduction mode, a pickup means 503 reads the data recorded on the disk 10. The pickup means 503 is moved to a desired track of the disk 10 under the control of a driving section 504. An output of the pickup means 103 is supplied to a modulation and demodulation section 601, which demodulates the supplied signal. The demodulated data is supplied to an error correction data processing section 602, which corrects errors and supplies the resulting signal to a data string processing section 603. The data string processing section 603 extracts video data, subtitle and character data, and audio data. On the disk 10, the subtitle and character data and audio data are recorded so as to correspond to the video data, as explained later. Here, various languages can be selected for the subtitle and character data and audio data. The selection is made under the control of a system control section 604. The user supplies the input from an operator section 605 to the system control section 604.

Assuming that information on a movie is recorded on the disk 10, a plurality of scenes the user can select are recorded. To enable the user to select any one of the scenes, the data string processing section 603, the system control section 604, and the operator section 605 in the reproducing apparatus constitute data string control means and scene select means, in accordance with the user's operating of the operator section 605.

The video data separated at the data string processing section 603 is supplied to a video processing section 606, which carries out a decode process according to the type of display unit. For example, the video data is converted into a suitable form for an NTSC, PAL, SECAM, or wide screen. The video signal decoded at the video processing section 606 is supplied to an adder 608, which adds it with the subtitle and character data and supplies the addition result at an output terminal 609.

The audio data separated at the data string processing section 603 is supplied to an audio processing section 611, which demodulates it and supplies the demodulated signal at an output terminal 612.

The audio processing section acting as a decoding section, which contains an audio processing section 613 in addition to the audio processing section 611, can also reproduce speech in another language and supply this reproduced signal at an output terminal 614.

Figures 13, 14:
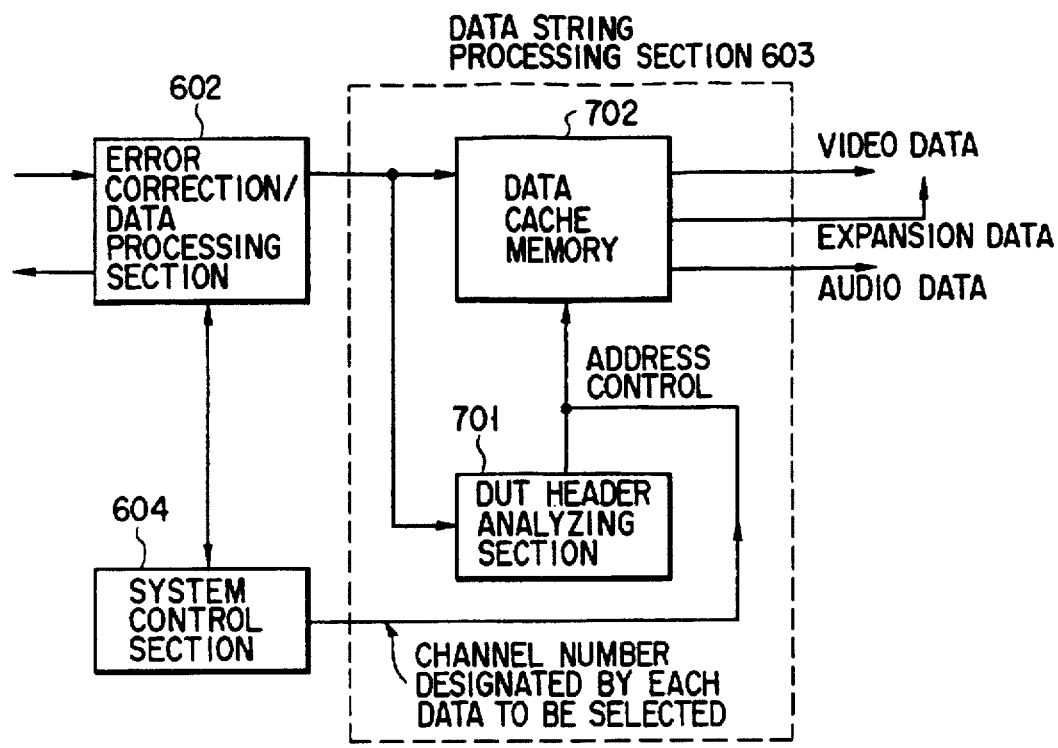
FIG. 13 is a block diagram showing the data-string processing section of the apparatus shown in FIG. 12.
FIG. 14 is a table showing the structure of the header section of a data unit.

FIG. 13 illustrates the data string processing section 603 (FIG. 12) in more detail.

The data string processing section 603 is designed to analyze the header (also known as "subcode") of each data unit, to separate the packets contained in the data unit, and to supply the packets to the respective decoders.

FIG. 14 shows the various types of data which are contained in the header of each data unit. The DUT header contains a program number, program time, data-unit size, the starting position of video data, the starting position of audio data, image-speech synchronization data, the starting position of sub-video data, and the like. The program number (i.e., the number assigned to the program) and the program time (i.e., the time required to process the data unit of the program) are 2-byte data items. The size of the data unit is represented in the number of bytes which forms it. The starting position of the video data is indicated by the ordinal number of the first byte of the video data, counted from the starting byte of the data unit. The image-speech synchronization data consists of the frame number and sample number of the audio data which corresponds to a specified picture frame. The starting position of the sub-video data is indicated by the ordinal number of the first byte of the sub-video data, counted from the starting byte of the data unit. Three identical sets, each comprised of data-unit size, starting position of video data, starting position of audio data, image-speech synchronization data, are recorded so that, in case one or two sets cannot be read or the disk has been damaged, the remaining set or sets may be read from the disk. In FIG. 14, the symbol "x 3" shows that this safety measure has been taken.

As shown in FIG. 13, the data string processing section 603 comprises a DUT header analyzing section 701 and a data cache memory 702. The section 701 analyzes the DUT header. The data unit is stored into the data cache memory 702. The section 701 can determine what kind of data is stored at which address in the data cache memory 702. It can therefore set a read address for the video data so that the video data (actually a GOP) may be read from the memory 702, separately from the other components of the data unit. The encoded audio data is read from the memory 702, also separately from the other components of the data unit. To read the audio data, it is necessary to supply a channel-designating address data to the data cache memory 702 from the system control section 604, since there are provided a plurality of channels. The encoded expansion data is read from the data cache memory 702 in a similar manner.

As has been explained, the embodiment can record data efficiently, easily manage data, reproduce programs in a special manner and search them at high speed. This is because each data unit is formed of a header portion, an expansion data portion, an encoded audio data portion and an encoded video data portion, and the header portion contains data-unit size, the starting position of video data, the starting position of audio data, the staring position of expansion data, image-speech synchronization data, and the like. The DUT header analyzing section 701 analyzes the header portion and determines what kind of data is stored at which address in the data cache memory 702, thereby setting a read address for the video data so that any encoded data may be supplied from the memory 702 to the decoder, separately from the other component of the data unit.

Safety measures have been taken to the disk, particularly to the management information, as will be explained below.

As shown in FIG. 15A, the information area of the disk 10 has a management area on the inner side and a data area outside the management area, for example. In the management area, management information needed to access the data in the data area is recorded as explained later. In the data area, information including a header, sub-video data, audio data, and video data is recorded.

As shown in FIG. 15B, in the management area, for example, the identical contents of management information are recorded in the section (P1 to P2) of the innermost two and half tracks and the next two-and-half track section (P2 to P3). That is, the start positions of the identical contents of management information are set on radiating lines with different angles on the disk 10. In this embodiment, the angle that two radiating lines make is 180 degrees.

Two sets of management information are recorded on the disk 10. Hence, if one of them cannot be read from the disk due to dirt, the other set of management information can be used. This prevents the important information from being lost in accessing the data area. The two sets of management information are recorded in different positions on the disk.

Therefore, even if the disk is scratched or stained with foreign matter, there is a very low probability that, for example, positions directly opposite each other with the center of the disk are damaged or stained with foreign matter as shown by a shaded portion. Accordingly, it is important in terms of safety that management information is recorded in different angular positions on the disk so that at least one set of the management information is readable.

If the management information cannot be read, it is particularly fatal to the reproduction of data from the disk. Thus, it is important that at least more than one set of the same management information is recorded on the disk as described above. Namely, as long as the management information can be read, the data on the disk can be accessed even if part of the data area is damaged. Since some data area may contain unused portions, recording at least more than one set of management information helps improve the reliability of the disk 10.

When the amount of all data recorded on the disk 10 is smaller than the total recording capacity of the disk, or when all pieces of the recorded data are important, more than one set of the managed information in the data area may be recorded as well. In this case, too, the start position of each item of information is set on a different radial line. In the embodiment described above, the recording start positions differ from each other by an angle of 180 degrees. The angular difference is not restricted to this. For instance, it may be 90 or other degrees. While in the embodiment, two sets of the same data are recorded, three or four sets of the same data may be recorded instead.

What types of data are recorded in the data area will be described.

FIG. 16 is an enlarged view of the contents of data unit DUT #0 in the data area. In data unit DUT #0, there is a subcode (SUB-CODE) at the start, followed by a sub-picture (SUB-PICTURE), audio data (AUDIO), video data (VIDEO) in that order. The subcode (SUB-CODE) contains the attributes of data unit DUT #0 and control data on the data unit. The sub-picture (SUB-PICTURE) contains subtitle data (for movie video) or character data (for kara-OK video and educational video), for example. The subtitle data and the character data are each given PICTURE #0 to #7, all of which or some of which differ from each other in language and the rest containing no signals. The audio (AUDIO) data is recorded in up to eight different languages AUDIO #0 through #7 (each reproduction lasts approximately one second). Each piece of audio data is recorded in frames, each frame, #0, #1, and so on being composed of headers (HEADERs) and data (DATA). The video data (VIDEO) contains 30 frames of images (approximately one second of reproduction), for example. The video (VIDEO) formation is recorded by any high-efficient image encoding compression techniques. The number of frames is not limited by standards.

As described above, different languages are recorded on the disk, and at least two decoders for speech reproduction are incorporated in the reproducing apparatus. Hence, at least two of the languages can be combined in the apparatus. For expensive models, more video decoders, more speech decoders, and more subtitle and character data decoders may be used.

An example of the management information recorded in the management area will be explained. The management information is stored in the form of a table.

As shown in FIG. 17A, a table of language codes is recorded in the VID, showing what language is recorded in which data area. The language code correspond to description codes 0, 1, . . . , 8. In this example of a disk, the description code 0 corresponds to non-language, or background sound and music (B & M), and the description codes 1, 2, 3, and 4 correspond to English, Japanese, French, and German, respectively. The correspondence between each description code and each language code is known when the VID is read at the start of the reproducing apparatus.

On the other hand, bit data strings are defined in the PIF table. Specifically, description codes correspond to data string numbers #0 through #7 on the disk (FIG. 17B). When a data string number is selected, a description code is determined and the language code corresponding to the description code is also determined.

Therefore, when the reproducing apparatus reads the data in the PIF table, it displays the first menu screen in accordance with data string numbers #0 to #7 (a display by the key display signal). This display is effected by, for example, supplying a language code to a conversion table to generate the display data corresponding to each language code. To supply the code of a language the user can understand, the user only needs to select and input the corresponding data string number by operating the operator section.

For example, when the user selects the data string number #0, the description code 1 is displayed. At this time, D1 (i.e., English) is selected for speech. When the user selects the data string number #2, D2 (Japanese) is selected for speech.

After the user has selected a language, a producer's comment is displayed in the language selected. The data address at which the comment information is recorded is recorded in, for example, the VID table. The comment data is displayed in the language the user can understand. For example, it is displayed on the second menu screen, in the language which the user has selected at the first menu screen. If the user has selected #2 at the first menu screen, comments is displayed in Japanese. The comments include a greeting from the producer, the date of production, the intention of the product, and the program time in the case of movies, for example. Seeing these comments displayed, the user can select an output mode for speech and subtitles by pushing the speech and subtitle change button provided at the operator section. When the user pushes the speech change button, a cursor appears on the screen. Each time the speech change button is pressed, the cursor moves from one item to another in the language column, from non-language to Japanese, English, French, German, and so on, in the language column. Upon lapse of a predetermined time after the cursor has been moved to the desired item, the desired item is selected unless the button is pushed during that predetermined time. The subtitle change button is similarly operated, to select the subtitle in the desired language.

When neither the speech select button nor the subtitle change button has been operated for a predetermined time, the reproduction mode in the speech selected at the first menu screen will be effected. The speech output mode and the subtitle display mode can be changed during operation of the reproducing apparatus.

When one of the programs is selected, that is, when a data string is selected, the system control section of the reproducing apparatus controls the pickup-driving section. The pickup-driving section moves the pickup, which reads the selected program from the disk.

As may be understood from the above, the management information is extremely important in accessing to the disk. If the management information cannot be read, it would be fatal to the reproduction of data from the disk.

FIG. 18 is a flow chart explaining how the data string processing section 603 process the signals supplied to it via the error correction data processing section 602. The section 603 receives the data supplied from the section 602 and determines whether or not the data contains errors.

More specifically, the first management information is read from the disk (Steps S11 and S12). Then, the data string processing section 603 determines whether or not the information contains errors (Step S13). If NO, the information is stored as a management table into the work memory incorporated in the system control section 604 (Step S20). If YES, the section 603 determines whether or not the errors can be corrected, for example by counting the number of the errors (Step S14). If YES in Step S14, the errors are corrected (Step S19). The information, thus corrected, is stored as a management table into the work memory. If NO in Step S14, the second management information is read from the disk (Step 15). Next, the data string processing section 603 determines whether or not the information contains errors (Step S16). If NO in Step 16, the information is stored as a management table into the work memory incorporated in the system control section 604 (Step S20). If YES in Step S16, the section 603 determines whether or not the errors can be corrected, for example by counting the number of the errors (Step S17). If YES in Step S17, the errors are corrected (Step S19). The data, thus corrected, is stored as a management table into the work memory. If NO in Step S17, a warning is displayed (Step 18).

In the embodiment described above, it is determined whether the first management information is valid or invalid. If the first management information is invalid, the second management information is read from the disk. Instead, both the first management information and the second management information may be read from the disk and simultaneously be examined for errors. In this case, if errors are found in a part of one of the management information items, that part is automatically replaced by the corresponding part of the other management information, thereby removing errors, and the error-free management information is stored into the work memory.

As has been described, the reproducing apparatus and the disk, both according to the present invention, can minimizing the possibility that important information to be used in the apparatus is destroyed completely when the disk is damaged.

What is claimed is:

1. An apparatus for synchronizing compressed signals, comprising:
   an encoder section including:
      image grouping/compressing means for encoding a predetermined number of image frames which corresponds to a predetermined reproducing time of an original image, thereby generating encoded video data items, and for combining the encoded video data items into a video packet;
      speech grouping/compressing means for processing encoded audio data corresponding to the packet of encoded video data items, thereby generating speech frames, and for combining the speech frames into an audio packet;
      additional data generating means for generating additional data having a speech frame number assigned to the speech frame in said audio packet which represents an original speech corresponding to a start time of a specified image frame included in the video packet, said additional data generating means including:
         pulse generating means which is cleared by a program start pulse and which generates a specified image frame pulse used as an image frame pulse for the original image, at a time corresponding to the start of said specified image signal;
         first frequency dividing means for frequency-dividing speech sampling pulses for sampling the original speech, thereby obtaining a speech frame pulse;
         a speech sampling pulse counter which is cleared by the speech frame pulse supplied from said first frequency dividing means and which counts the speech sampling pulses;
         a speech frame pulse counter which is cleared by the program start pulse and which counts the speech frame pulses; and
         a register for latching a count value from said speech sampling pulse counter as the speech sample number and a count value from said speech frame counter as the speech frame number, in response to the specified image frame pulse, and for outputting the speech sample number and the speech frame number; and
      a formatter for combining the additional data, the audio packet and the video packet into a data unit; and
   a decoder section including:
      decoding means for decoding the encoded video data, encoded audio data and additional data of each data unit; and
      output timing setting means for setting timing of outputting a first specified image frame, when a speech frame number contained in said encoded audio data coincides with a speech frame number contained in said addition data.

2. The apparatus according to claim 1, wherein said output timing setting means comprises:
   means for extracting the speech frame number from the encoded audio data;
   comparing means for comparing the speech frame number extracted from the encoded audio data with the speech frame number contained in the additional data;

means for presetting the speech sample number contained in the additional data into an address counter, in response to a coincidence pulse generated by said comparing means;

audio reading means which starts reading decoded audio data from a speech block buffer in response to an address supplied from said address counter; and video reading means which starts reading decoded video data from an image block buffer in response to the coincidence pulse.

3. An apparatus for synchronizing compressed signals, comprising:

an encoder section which comprises:

image grouping/compressing means for encoding a predetermined number of image frames which corresponds to a predetermined reproducing time of an original image, thereby generating encoded video data items, and for combining the encoded video data items into a video packet;

speech grouping/compressing means for processing encoded audio data corresponding to the packet of encoded video data items, thereby generating speech frames, and for combining the speech frames into a audio packet;

additional data generating means for generating additional data consisting of a speech frame number assigned to that speech frame included in said audio packet which represents an original speech corresponding to a specified image frame included in the video packet; and a formatter for combining the additional data, the audio packet and the video packet into a data unit, and a decoder section which comprises:

image decoding means for decoding the encoded video data of each data unit into a decoded video data;

a frame buffer for storing the decoded video data of each data unit, supplied from said image decoding means;

speech decoding means for decoding the encoded audio data of each data unit into decoded audio data;

a speech block buffer for storing the decoded audio data of each data unit, supplied from said speech decoding means;

first frequency dividing means for frequency-dividing an internal clock signal, thereby generating an image frame pulse defining a timing of outputting data from said frame buffer;

a second frequency dividing means for frequency-dividing the internal clock signal, thereby generating a speech sampling pulse and a speech frame pulse;

a decoded speech sample address counter which is reset by the speech frame pulse, which counts speech sampling pulses and which generates a read address for said speech block buffer;

a register for latching the read address generated by said decoded speech sample address counter, in response to a specified image frame pulse obtained by frequency-dividing the image frame pulse; and means for comparing a speech sample number contained in the additional data with the address supplied from the register, and for performing synchronization adjustment on the image frame pulse under the control of said first frequency dividing means or on the decoded speech sampling pulse under the control of said second frequency dividing means, when a difference between the speech sample number and the address is equal to or greater than a predetermined value.

* * * * *